US009353726B2

(12) United States Patent
Deese et al.

(10) Patent No.: US 9,353,726 B2
(45) Date of Patent: May 31, 2016

(54) ROTOR HUB MAINTENANCE SYSTEM

(76) Inventors: Kenneth A. Deese, Oklahoma City, OK (US); Matthew J. McBride, Westfield, PA (US)

(*) Notice: Subject to any disclaimer, the term of this patent is extended or adjusted under 35 U.S.C. 154(b) by 818 days.

(21) Appl. No.: 13/588,707

(22) Filed: Aug. 17, 2012

(65) Prior Publication Data

US 2012/0321483 A1   Dec. 20, 2012

Related U.S. Application Data

(62) Division of application No. 12/367,385, filed on Feb. 6, 2009, now Pat. No. 8,250,759.

(60) Provisional application No. 61/065,084, filed on Feb. 7, 2008.

(51) Int. Cl.
*F03D 1/00* (2006.01)

(52) U.S. Cl.
CPC .............. *F03D 1/003* (2013.01); *F05B 2230/70* (2013.01); *F05B 2230/80* (2013.01); *Y02E 10/72* (2013.01); *Y02P 70/523* (2015.11); *Y10T 29/37* (2015.01); *Y10T 29/49318* (2015.01); *Y10T 29/49721* (2015.01); *Y10T 29/49815* (2015.01)

(58) Field of Classification Search
CPC ......... F03D 1/001; F03D 1/003; F03D 1/005; F05B 2230/70; F05B 2230/80; Y10T 29/37; Y10T 29/49815; Y10T 29/49318; Y10T 29/49721; F16M 3/00; F16M 11/20
USPC .................................... 248/671, 346.01, 352
See application file for complete search history.

(56) References Cited

U.S. PATENT DOCUMENTS

| 4,086,024 | A |   | 4/1978  | Weiland et al. |
|-----------|---|---|---------|----------------|
| 4,382,733 | A | * | 5/1983  | Rodgers .......................... 410/49 |
| 4,567,649 | A |   | 2/1986  | Ades et al. |
| 4,790,113 | A |   | 12/1988 | Gregory |
| 4,793,110 | A |   | 12/1988 | Tucker |
| 4,796,941 | A |   | 1/1989  | Reilly |
| 4,980,999 | A |   | 1/1991  | Terenzoni |
| 5,348,171 | A |   | 9/1994  | Haman et al. |
| 5,738,747 | A |   | 4/1998  | Blanchard |

(Continued)

FOREIGN PATENT DOCUMENTS

| DE | 10211357 A1 | * | 9/2002 |
| FR | 2919903 A1  | * | 2/2009 |

(Continued)

OTHER PUBLICATIONS

Election/Restriction Office Action mailed Nov. 14, 2011 in U.S. Appl. No. 12/367,385, filed Feb. 6, 2009; Inventor(s): Kenneth A. Deese, et al.; pp. 1-6.

(Continued)

*Primary Examiner* — Ninh H Nguyen
*Assistant Examiner* — Jesse Prager
(74) *Attorney, Agent, or Firm* — Hall Estill Attorneys at Law; Daniel P. Dooley

(57) ABSTRACT

A rotor hub maintenance system and method is disclosed. The system includes at least a rotor hub, a plurality of appendages that are operatively connectable to the hub, and a plurality of support members. The preferred embodiment provides that the support members simultaneously secure the hub and appendages a predetermined height above a reference surface and provide the only support for the hub and appendages.

10 Claims, 7 Drawing Sheets

(56) References Cited

U.S. PATENT DOCUMENTS

| | | | |
|---|---|---|---|
| 5,871,314 | A | 2/1999 | Trionfetti |
| 5,966,956 | A | 10/1999 | Morris et al. |
| 6,106,211 | A | 8/2000 | Westwood |
| 6,868,646 | B1 | 3/2005 | Perina |
| 6,968,905 | B2 | 11/2005 | Adnan et al. |
| 7,111,548 | B2 | 9/2006 | Viaud |
| 7,207,777 | B2 * | 4/2007 | Bervang .................. 416/119 |
| 7,331,280 | B2 | 2/2008 | Viaud |
| 7,377,362 | B2 | 5/2008 | Blodgett, Jr. et al. |
| 7,467,507 | B2 | 12/2008 | Viaud |
| 7,481,168 | B2 | 1/2009 | Pike et al. |
| 7,708,523 | B2 * | 5/2010 | Sakaue .................. 416/1 |
| 7,721,434 | B2 | 5/2010 | Weaver et al. |
| 7,744,318 | B2 * | 6/2010 | Wobben .................. 410/45 |
| 7,836,595 | B1 | 11/2010 | Ohl, Jr. |
| 2008/0216301 | A1 | 9/2008 | Hansen et al. |
| 2010/0080705 | A1 | 4/2010 | Pronovost et al. |
| 2010/0135797 | A1 | 6/2010 | Nies |

FOREIGN PATENT DOCUMENTS

| | | |
|---|---|---|
| FR | 2920206 A1 * | 2/2009 |
| WO | WO 2005108786 A1 * | 11/2005 |

OTHER PUBLICATIONS

Response to Election/Restriction Office Action filed Dec. 14, 2011 in U.S. Appl. No. 12/367,385, filed Feb. 6, 2009; Inventor(s): Kenneth A. Deese, et al.; pp. 1-6.

Non-final Office Action mailed Jan. 18, 2012 in U.S. Appl. No. 12/367,385, filed Feb. 6, 2009; Inventor(s): Kenneth A. Deese, et al.; pp. 1-7.

Response to Non-final Office Action filed Apr. 18, 2012 in U.S. Appl. No. 12/367,385, filed Feb. 6, 2009; Inventor(s): Kenneth A. Deese, et al.; pp. 1-7.

* cited by examiner

ROTOR HUB MAINTENANCE SYSTEM

RELATED APPLICATIONS

This application is a Divisional Application of U.S. Non-Provisional application Ser. No. 12/367,385 filed Feb. 6, 2009, entitled "Rotor Hub Maintenance System," which claims domestic priority to U.S. Provisional Application No. 61/065,084 filed Feb. 7, 2008, entitled "Rotor Hub Maintenance System."

FIELD OF THE INVENTION

The claimed invention relates to the field of maintenance equipment; more particularly, but not by way of limitation, to rotor hub maintenance equipment.

BACKGROUND

The ability to safely and efficiently perform maintenance on rotor hubs has been a continual goal of the engineering service industry.

Historically, rotor hubs have been maintained through time consuming, potentially dangerous processes. For example, wind turbine rotors are currently removed and suspended during routine maintenance with several cranes working in conjunction. Similarly, wind turbine rotors have traditionally been removed and positioned for placement on a central stand in close proximity to the ground. While cranes continue to suspend the rotor hub assembly, workmen perform maintenance on the rotor hub. When finally placed on the central stand, the large scale of a typical wind turbine in combination with a lack of support for protruding blades creates potential hazards for workmen's continued maintenance of the rotor hub. As the rotor is pivotally connected to the ground via a small stand in the current maintenance process, any wind can create torque that violently shifts the rotor hub assembly. Likewise, the current maintenance techniques require workmen to spend extended amounts of time on their back under the suspended load.

The slightest failure in the suspension of the rotor hub, or in the rotor itself, is potentially devastating to the workmen.

With tedious maintenance being performed on wind turbines several times a year, the dangers of maintenance worker safety is compounded by the structural risks associated with current maintenance techniques. The current method of suspending a rotor hub with multiple cranes stresses the joints, increases maintenance time, and decreases the useful life. A lack of support for individual rotor blades creates stresses throughout the rotor assembly as well as safety hazards for workmen under the rotor and operating suspension cranes. Further, a close proximity to the ground does not provide workers with enough room to efficiently assess the rotor hub and perform scheduled maintenance.

The combination of a large suspended load with inefficient area to perform maintenance generates a volatile situation that unnecessarily creates hazards for workmen and the rotor hub assembly. Accordingly, there is a continuing need for improved systems for maintaining rotor hubs.

SUMMARY OF THE INVENTION

In accordance with the preferred embodiments, a rotor hub maintenance system includes at least a rotor hub, a plurality of appendages that are operatively connectable to the hub, and a plurality of support members. The preferred embodiment provides that the support members simultaneously secure the hub and appendages a predetermined height above a reference surface and provide the only support for the hub and appendages.

In an alternative preferred embodiment, a method of maintaining a rotor hub includes at least the steps of providing a rotor hub, a plurality of appendages that are operatively connectable to the hub, and a plurality of support members. Further, the rotor hub and appendages are simultaneously supported with only the support members.

These and various other features and advantages that characterize the claimed invention will be apparent upon reading the following detailed description and upon review of the associated drawings.

DETAILED DESCRIPTION

Reference will now be made in detail to one or more examples of the invention depicted in the figures. Each example is provided by way of explanation of the invention, and not meant as a limitation of the invention. For example, features illustrated or described as part of one embodiment may be used with another embodiment to yield still a different embodiment. Other modifications and variations to the described embodiments are also contemplated within the scope and spirit of the invention.

Figure 1:
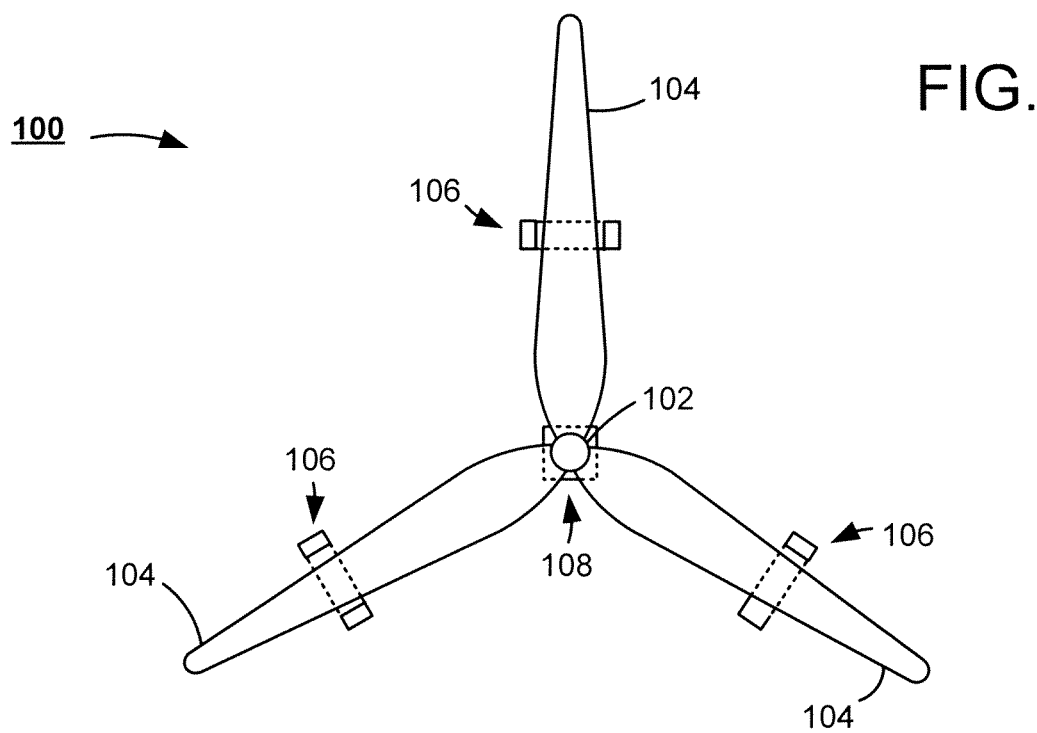
FIG. 1 displays a top view of the preferred embodiment of the rotor hub maintenance system.

Referring to the drawings, FIG. 1 shows a top view of the preferred embodiment of the rotor hub maintenance system 100. The rotor hub maintenance system 100 is characterized by a rotor hub 102 to which a plurality of appendages 104 are operatively connectable. Several appendage support members 106 interact with the appendages 104 to support the rotor hub 102. In an alternative embodiment, a hub support member 108 is disposed at the vertex of the appendages 104 while interacting with the rotor hub 102.

It should be noted that the number of appendages 104 shown in FIG. 1 is not limiting and any number of appendages can be radially disposed around the hub while keeping with the spirit of this invention. Similarly, the shape of the appendages can be any profile without hindering the various embodiments of the present invention. Also, the appendage support members and the hub support member are referred to as "support members" for simplicity. However, the use of the hub support member 108 as part of the hub maintenance system 100 is not required and can be omitted if necessary.

As discussed below, the rotor hub maintenance system 100 allows for the rotor hub 102 and appendages 104 to be secured by the support members a predetermined distance above a reference plane. FIG. 1 displays the top view of how the hub and appendages are secured by the support members in a preferred embodiment. It should be noted that the hub 102 and appendages 104 are balanced and upheld by the support members that are preferably capable of supporting the entire weight of each component. That is, each support member securing each appendage is capable of supporting the entire weight of the appendage. Likewise, the hub support member is capable of securing and supporting at least the weight of the rotor hub 102.

Figure 2:
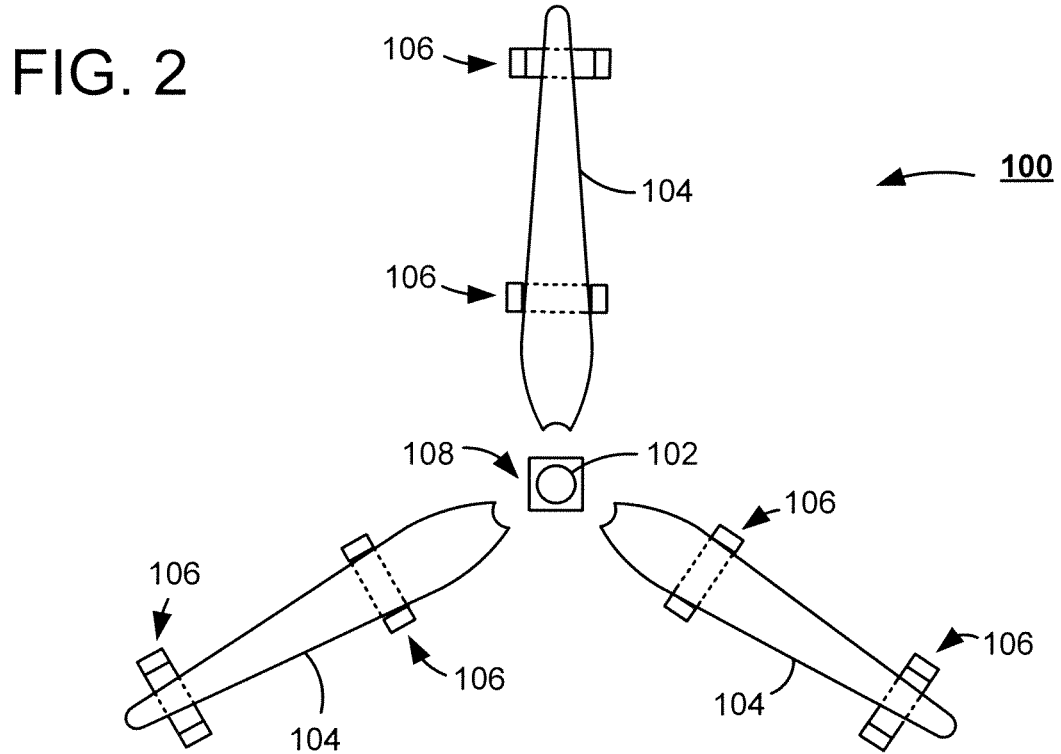
FIG. 2 shows a top view of an alternative embodiment of the rotor hub maintenance system.

FIG. 2 shows a top view of an alternative embodiment of the rotor hub maintenance system. The alternative embodiment illustrates multiple appendage support members interacting with each appendage 104. Further, each appendage 104 is disconnected with the rotor hub 102 which increases access to vital areas of the rotor hub and appendages for maintenance. The support of the rotor hub 102 is fully facilitated by the hub support member in this alternative embodiment. As FIG. 2 displays, each appendage 104 as well as the rotor hub 102 are autonomous from each other component and can be replaced or repaired individually or in combination as needed.

The use of multiple appendage support members 106 for each appendage 104 provides the ability to fully balance and control the appendage 104. This greatly improves efficiency of variable pitch appendages that have a skewed leading edge. In addition, proper maintenance of the appendages 104 and rotor hub 102 often mandates the inspection of small areas that are not easily accessible when the appendages 104 are connected to the rotor hub 102.

Figure 3:
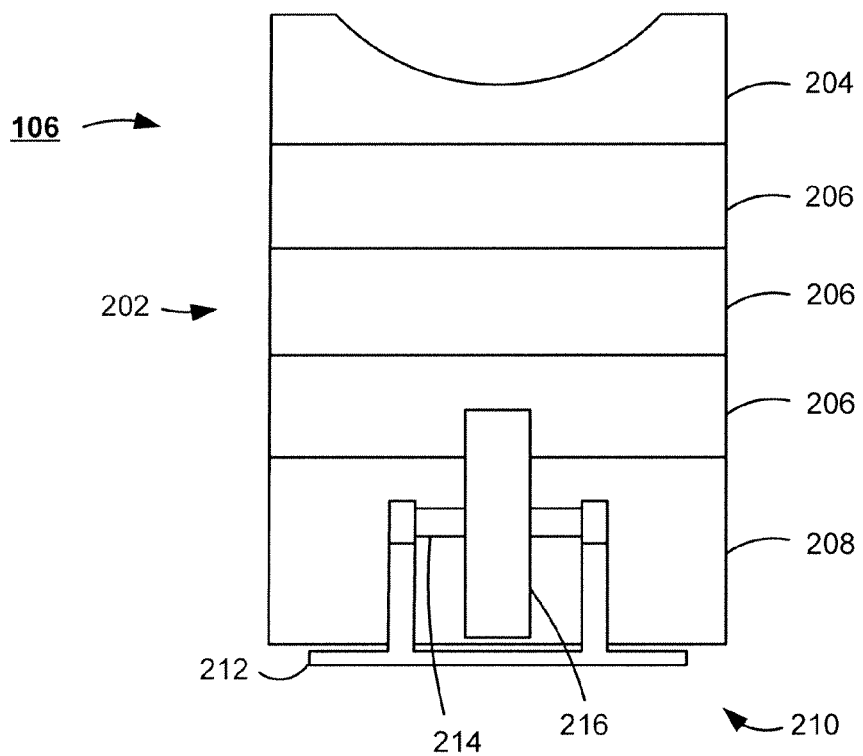
FIG. 3 illustrates a front view of the appendage support member component of the rotor hub maintenance system.

In FIG. 3, a front view of the appendage support member 106 is shown constructed in accordance with various embodiments of the present invention. The appendage support member 106 contains a main body portion 202. In a preferred embodiment, the main body portion 202 includes a first density portion 204, a second density portion 206, and a third density portion 208. In an alternative embodiment, the main body portion 202 includes a material of constant density. However, it should be noted that the main body portion 202 can comprise any number of layers of various densities.

Likewise, the various density portions can be composed of any variety of energy absorbing material including, but not limited to, foam, plastic, or metal. For example, the first density portion 204 can be constructed of a honeycomb metal while the layers of the second density portions 206 are made of varying density foam. However, the density portions shown in FIGS. 3 and 4 do not restrict the use of multiple materials being packed into the main body portion 202. That is, any, or all, of the density portions of the main body portion 202 can be constructed of an outer containment shell filled with energy absorbing pieces of material.

Further, the main body portion 202 is supported by an adjustment member 210 that provides a base for the main body portion 202 and includes a movement member 212 which supports an axle 214 and a wheel 216. A preferred embodiment has the wheel 216 being disengaged from a reference surface when not in use. That is, the wheel 216 is not touching the ground while in place. To move the appendage support member 106, a user would tilt the support member 106 to engage the wheel 216 to the ground and enable movement.

Figure 4:
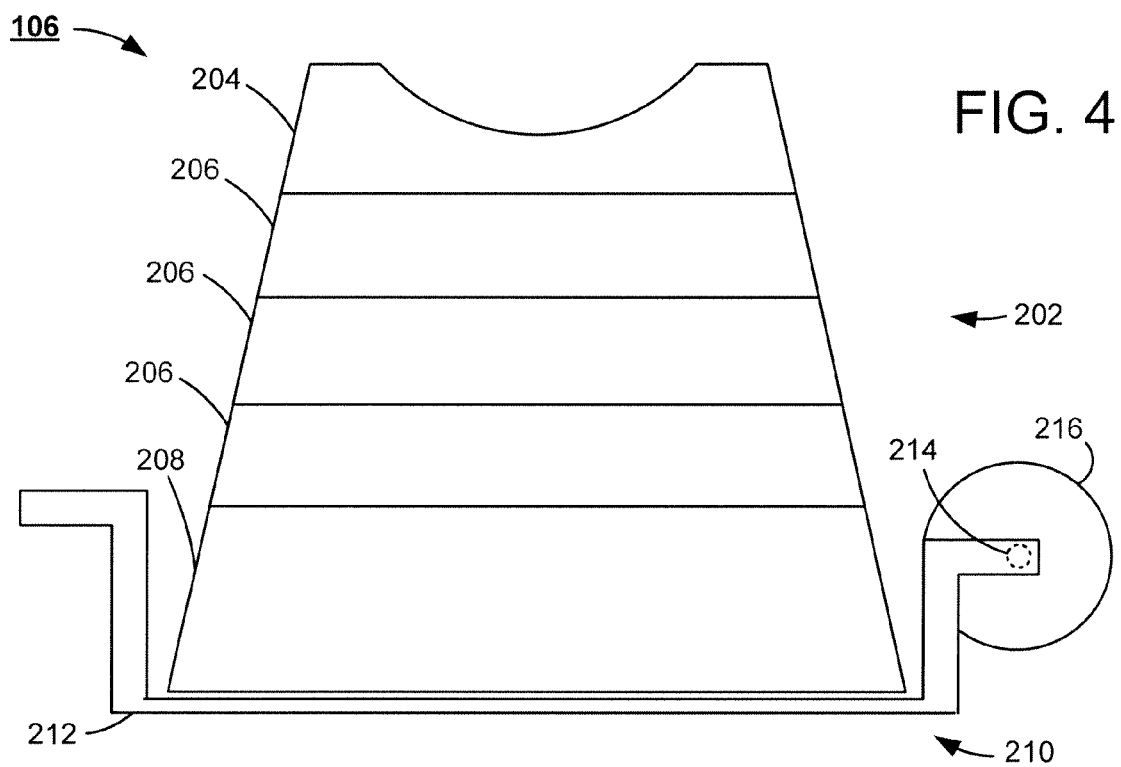
FIG. 4 displays a side view of the appendage support member component of FIG. 3 in accordance with various embodiments of the present invention.

FIG. 4 shows a side view of the appendage support member 106. A preferred embodiment of the appendage support member 106 includes the main body portion 202 configured in a sloped shape that is defined by the first density portion 204 having a smaller surface area than the third density portion 208. However, the shape, surface area, and orientation of the various density portions shown in FIGS. 3 and 4 are not limiting and can be a number of various embodiments that provide necessary support for an appendage.

In an alternative embodiment, the adjustment member 210 can be removed from the appendage support member 106. Hence, the adjustment member 210 can be permanently or temporarily coupled to the appendage support member 106 to enable movement.

Figure 5:
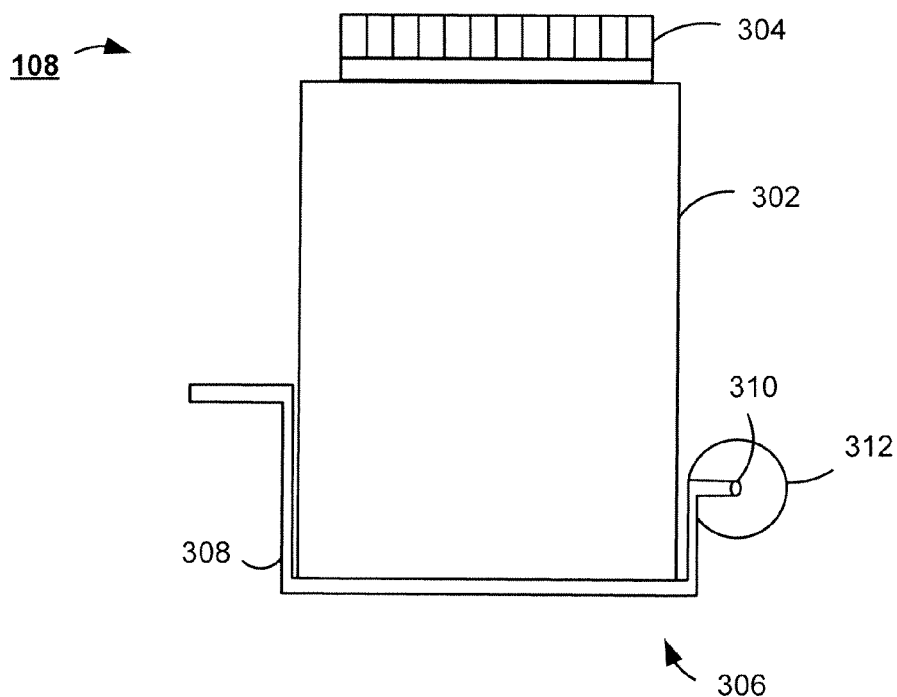
FIG. 5 shows a side view of the hub support member component of the rotor hub maintenance system.

In FIG. 5, a side view of a hub support member 108 is illustrated as constructed in accordance with various embodiments of the present invention. The hub support member 108 preferably includes a main body member 302 to which a stud retention member 304 is operatively connected. In a preferred embodiment, an adjustment member 306 provides a base for the main body member 302. Similarly to the adjustment member 210 of FIGS. 3 and 4, the adjustment member 306 includes a movement member 308, an axle 310, and at least one wheel 312 to enable efficient movement of the hub support member 306.

As with the adjustment member 210 of FIGS. 3 and 4, the adjustment member 306 allows the wheel to be disengaged from a reference surface while the hub support member 108 is set. It should be noted that the hub support member 108 can be removed from the adjustment member 306, as needed.

Figure 6:
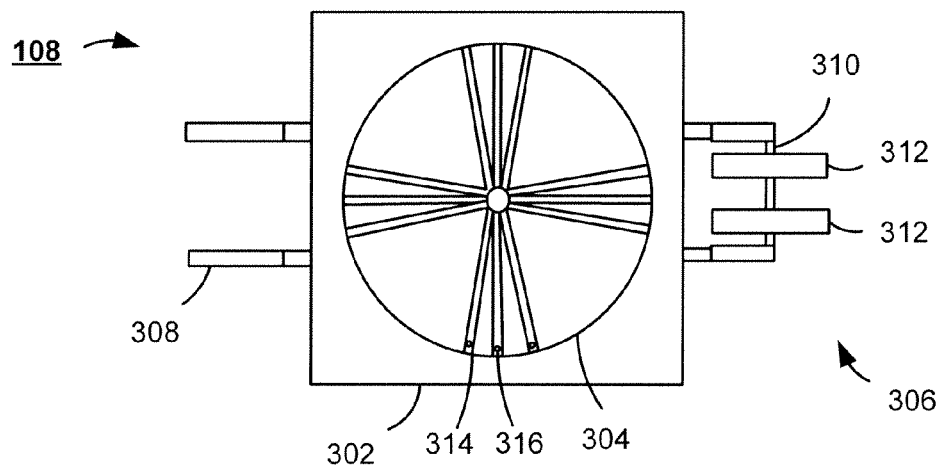
FIG. 6 provides a top view of the hub support member component of FIG. 5.

FIG. 6 displays a top view of the hub support member 108 of FIG. 5. The hub support member 108 includes a main body member 302 to which a stud retention member 304 is operatively connected. In various embodiments, the stud retention member 304 can include a plurality of stud members 314 to operatively secure the studs of a rotor hub 102. In an alternative preferred embodiment, the adjustment member 306 interacting with the main body member 302 includes a plurality of wheels 312

In addition, the number and orientation of the stud members 314 shown in FIG. 6 are not limited and can be placed in any configuration that allows for attachment of a rotor hub. It is contemplated that the stud members 314 provide a plurality of fastening apertures 316 to accommodate the various possible fasteners of the rotor hub. For example, the stud members 314 can have bolt holes to which the rotor hub bolts are received and fastened. As a result, the rotor hub is effectively mounted to the hub support member 108 and can be examined and repaired without fear of instability.

Figure 7:
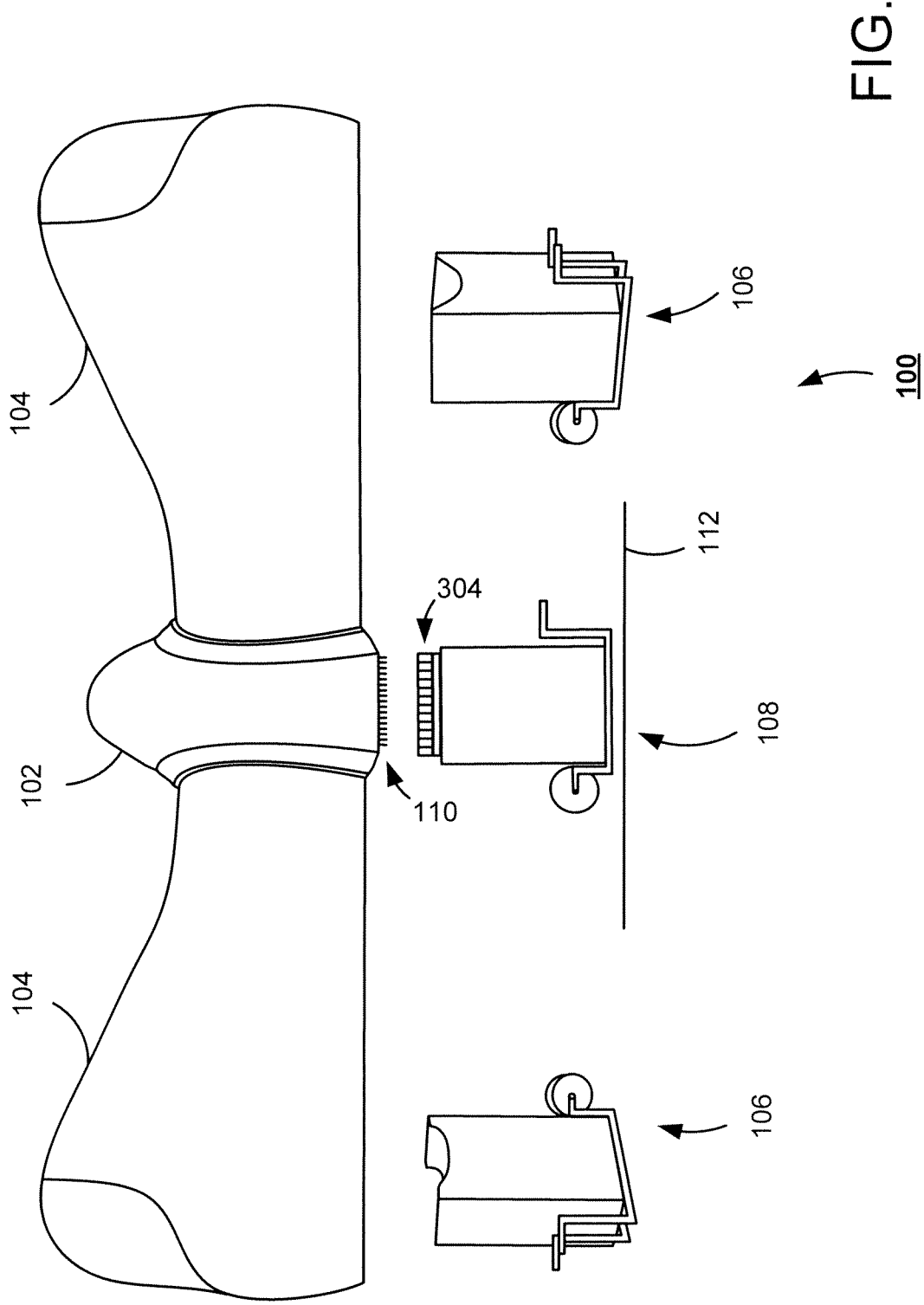
FIG. 7 illustrates an exploded front perspective view of the rotor hub maintenance system in a preferred embodiment.

In FIG. 7, an exploded perspective view of the rotor maintenance system 100 is shown. The rotor hub maintenance system 100 preferably includes a rotor hub 102 operatively connectable to a plurality of appendages 104. The rotor hub 102 also preferably includes a stud region 110 which operatively secures to the stud retention member 304 of the hub support member 108. Further, the appendages 104 are each being shown supported by blade support members 106. The preferred embodiment includes the appendage support members 106 interacting with the appendages 104 to support the rotor hub 102 a predetermined height off of a reference surface 112.

One skilled in the art can recognize that in operation the appendage support members 106 engage the appendages 104 on multiple sides to provide balance and control. Similarly, the stud retention member 304 is capable of receiving and securing one, or many, of the studs in the stud region 110. It should be noted that the adjustment members for the support members are present during operation shown in FIG. 7, but are not required. Also, the hub support member 108 can be optionally omitted from the system 100 when the appendages 104 and rotor hub 102 are connected.

Figure 8:
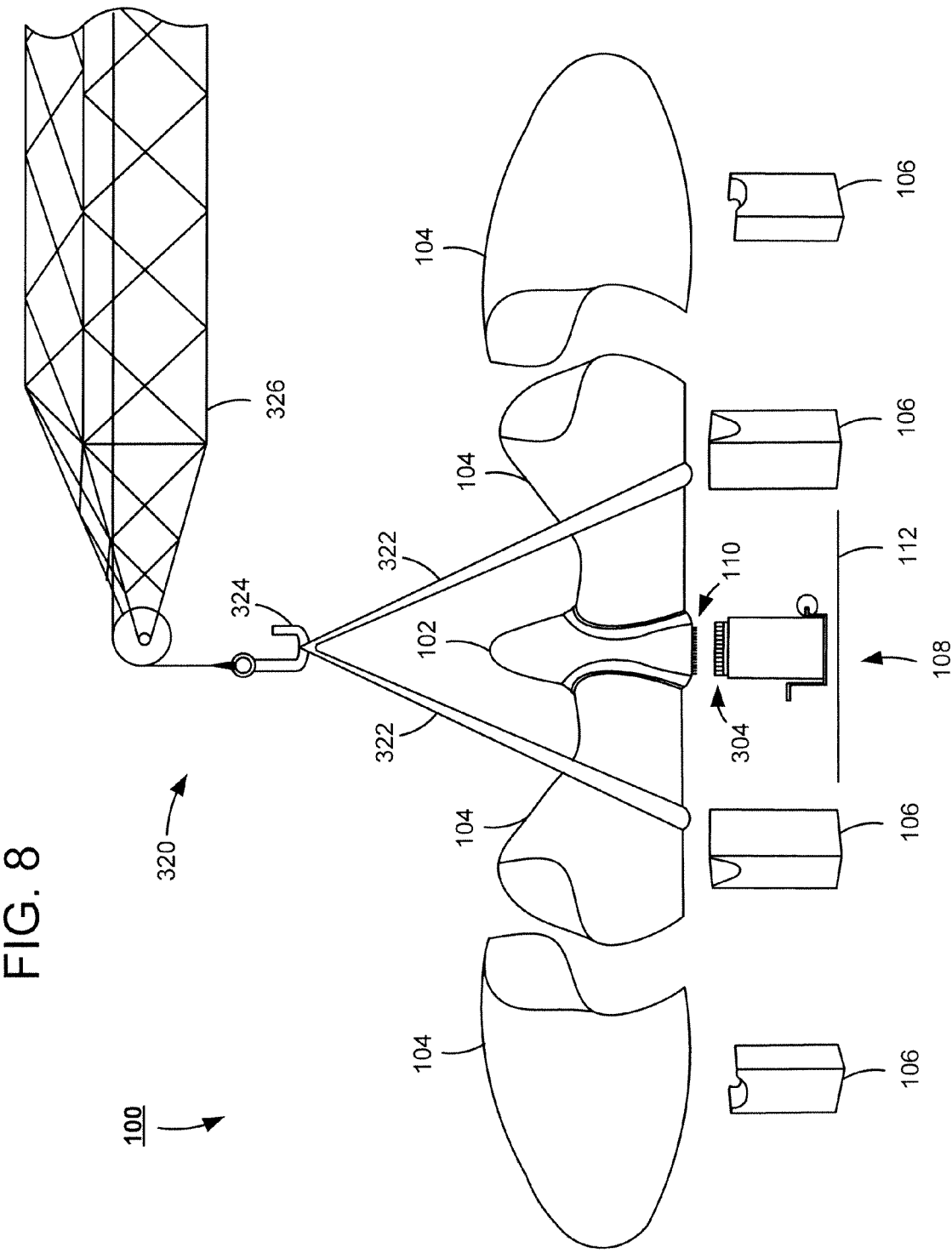
FIG. 8 displays an exploded front perspective view of the rotor hub maintenance system in an alternative embodiment.

FIG. 8 illustrates an exploded perspective view of the rotor hub maintenance system in an alternative embodiment. The alternative embodiment includes multiple appendages support members 106 interacting with each appendage 104. The plurality of support members 106 and 108 support the rotor hub 102 and appendages 104 a predetermined height off of a reference surface 112. A hoisting mechanism 320 is shown providing additional support for the hub 102 and appendages 104. In some embodiments, the hoisting mechanism 320 comprises a number of hoisting straps 322 connected to the appendages 104 and a hoisting member 324 that is attached to a hoisting apparatus 326.

The hoisting mechanism 320 displayed in FIG. 8 is merely a representation of a possible additional support. In an alternative preferred embodiment, the hoisting mechanism is a crane that is utilized to position the appendages 104 and rotor hub 102 onto the support members. Further in a preferred embodiment, the hoisting mechanism 320 is disconnected from the appendages 104 and rotor hub 102 after positioning so that the support members secure and balance the entire weight of the appendages 104 and rotor hub 102.

Attention should be drawn to the appendage support members 106 which have been removed from their respective adjustment members so that the third density portion engages the reference surface 112. Likewise, the heights of the appendage support members 106 closest to the rotor hub 102 are taller than the distal appendage support members 106. Meanwhile, the hub support member 108 remains coupled to an adjustment member. As such, the support members can support the rotor hub and appendages in various configurations that may include different heights, presence of adjustment members, and positioning mechanisms.

While a crane is shown in FIG. 8 as an embodiment of the hoisting mechanism 320, the representation is not limiting and the mechanism can be anything that is capable of supporting and positioning the appendages 104 and rotor hub 102 onto the support members.

Figure 9:
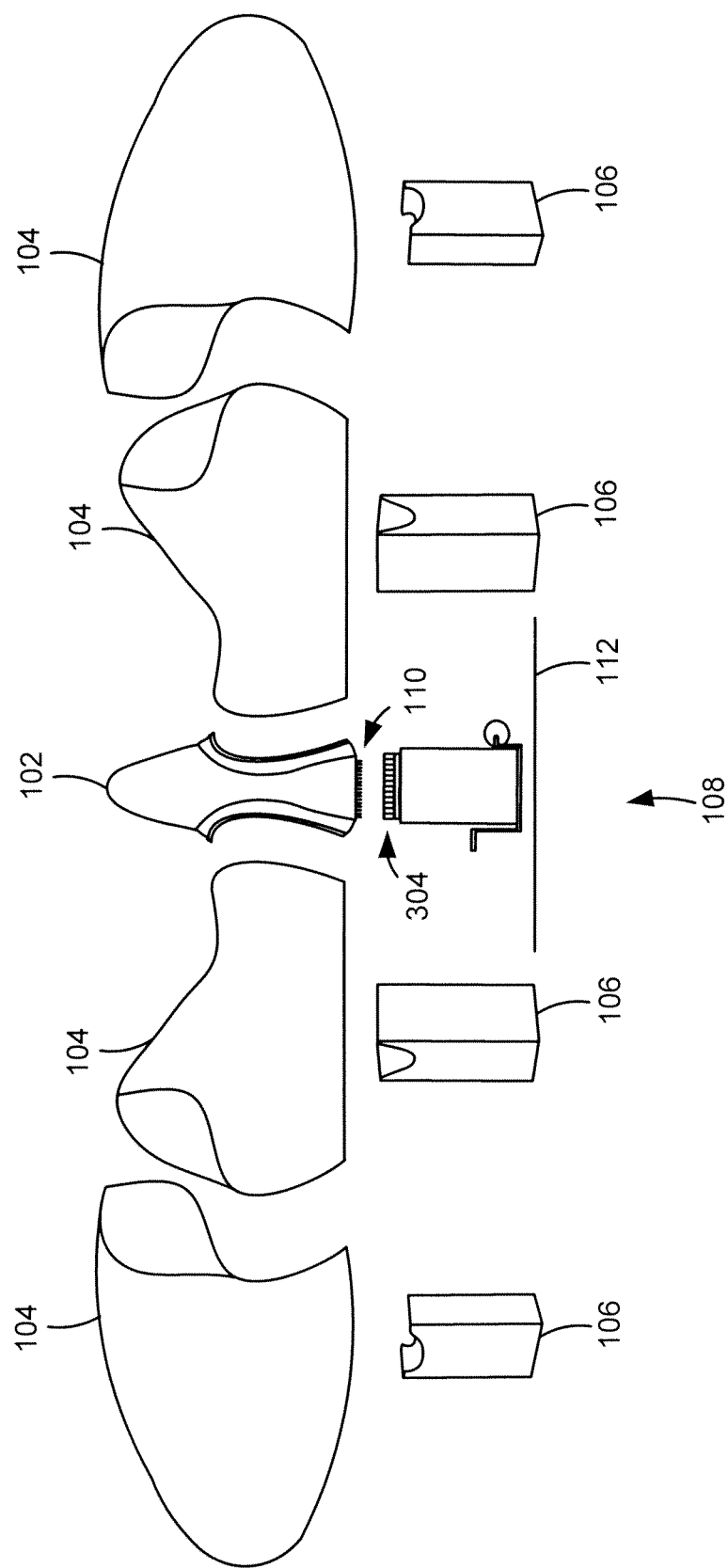
FIG. 9 shows an exploded front perspective view of the rotor hub maintenance system in an alternative embodiment.

In FIG. 9, an exploded perspective view of the rotor hub maintenance system in an alternative embodiment is shown. The appendages 104 are each shown detached from the rotor hub 102 and interacting with multiple appendage support members 106. This alternative embodiment includes the rotor hub 102 interacting with the hub support member 108 to restrain the rotor hub 102 a predetermined height off of a reference surface 112. The stud region 110 of the rotor hub 102 is also displayed operatively secured to the stud retention member 304 of the hub support member 108.

It should be noted that the position of the appendage support members 106 in relation to the appendages 104 are different in FIG. 9 than displayed in FIG. 8. This illustrates the non-limiting orientation of the appendage support members 106 and one of the many possible configurations that are capable of securing the full weight of each appendage while disconnected from the rotor hub 102.

Figure 10:
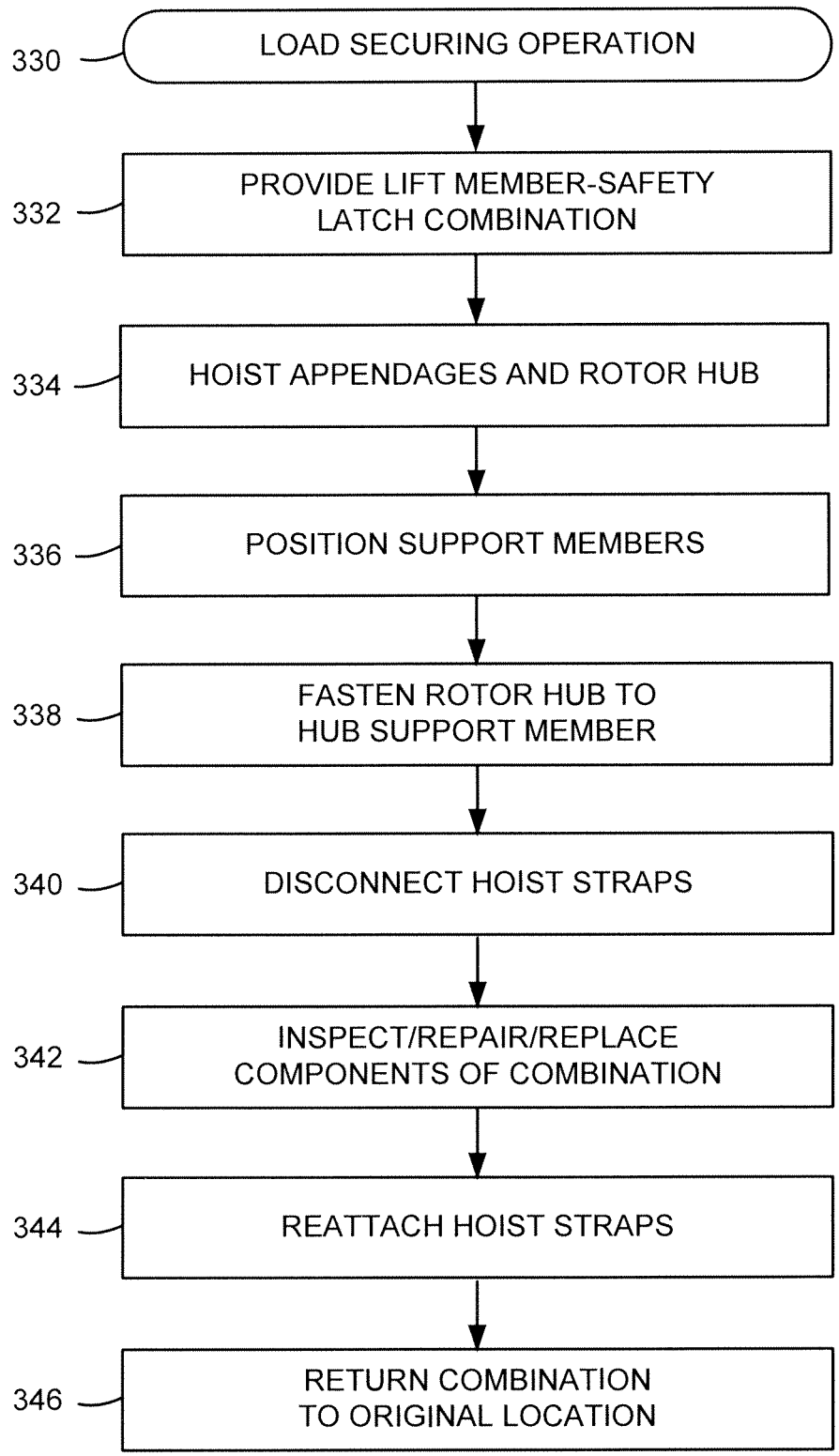
FIG. 10 provides a flow chart representation of a rotor hub maintenance operation performed in accordance with various embodiments of the present invention.

FIG. 10 provides a flow chart of a rotor hub maintenance operation 330 performed in accordance with various embodiments of the present invention. The operation 330 begins with a rotor hub, plurality of appendages, and plurality of support members as a lift member-safety latch combination being provided at step 332. A hoisting mechanism is used in step 334 to position the appendages and rotor hub in close proximity to the support members. In step 336, the support members are positioned at predetermined locations on the appendages and rotor hub to enable secure support after the hoisting mechanism is disconnected.

Further in step 338, the stud region of the rotor hub is fastened to the hub support member while the appendages rest in the recessed portion of each appendage support member. Step 340 involves disconnecting the hoisting straps for the appendages so that the support members provide the only support. An inspection, repair, or replacement of any components of the rotor hub or appendages is conducted in step 342 before the hoisting straps are reattached in step 344. Finally in step 346, the rotor hub and appendages are returned to an original location.

The various steps associated with the maintenance operation 330 are merely representations of a possible procedure. Thus, various steps can be omitted or substituted with other steps while adhering to the spirit of this invention.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims. Furthermore, in various embodiments the rotor hub and appendages can combine to comprise a wind turbine capable of generating electrical energy from the wind. That is, the rotor hub and appendages can be wind turbine components that connect and function as a wind turbine.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed by the appended claims.

What is claimed is:

1. A rotor hub maintenance system comprising:
   a rotor hub;
   a plurality of appendages operatively connectable to said hub; and
   a plurality of support members that simultaneously secure the hub and appendages a predetermined height off of a reference surface, wherein the support members provide the only support for the hub and appendages, and wherein each of the plurality of support members comprising:
   a main body;
   an axle connected to said main body; and
   a wheel operatively connected to said axle, and in which the wheel is disengaged from the reference surface after positioning the support members.

2. The rotor hub maintenance system of claim 1, in which the rotor hub and appendages combine to form a wind turbine.

3. The rotor hub maintenance system of claim 1, in which the plurality of support members include a hub support member and a number of appendage support members.

4. The rotor hub maintenance system of claim 1, in which the rotor hub and appendages are positioned onto the support members by a hoisting mechanism.

5. The rotor hub maintenance system of claim 3, in which the appendage support members comprise a recessed portion that supports each appendage on multiple sides.

6. The rotor hub maintenance system of claim 3, in which the appendage support members comprise multiple layers of energy absorbing material.

7. The rotor hub maintenance system of claim 3, in which the hub support member operatively engages the rotor hub and is positioned at a vertex of the appendages.

8. The rotor hub maintenance system of claim 3, in which the hub support member secures the rotor hub with fastening bolts.

9. The rotor hub maintenance system of claim 3, in which the appendage support members are each capable of supporting the weight of each appendage.

10. The rotor hub maintenance system of claim 3, in which a single hub support member interacts with the rotor hub while each appendage interacts with multiple appendage support members.

\* \* \* \* \*